United States Patent [19]

Ordanian et al.

[11] 4,186,022
[45] Jan. 29, 1980

[54] SUPERHARD COMPOSITE MATERIAL

[75] Inventors: Sergei S. Ordanian; Vladislav S. Lysanov; Viktor V. Digonsky; Vadim A. Blinkov; Ljubov A. Pekelis; Vera I. Denisova; Vladimir I. Unrod; Sergei V. Sinelnikov; Marina P. Chestnokova, all of Leningrad, U.S.S.R.

[73] Assignees: Vsesojuzny Nauchno-Issledovatelsky Institut Abrazivov I Shlifovania; Leningradsky Politekhn Ichesky Institut Imeni Lensoveta, both of Leningrad, U.S.S.R.

[21] Appl. No.: 915,971

[22] Filed: Jun. 15, 1978

[51] Int. Cl.$^2$ .................. C04B 35/56; C04B 35/58
[52] U.S. Cl. ........................... 106/43; 51/307; 252/516
[58] Field of Search ................ 106/43; 51/307; 252/516

[56] References Cited

U.S. PATENT DOCUMENTS

| 2,888,355 | 5/1959 | Taylor | 106/43 |
| 3,582,078 | 12/1974 | Wakatsuki et al. | 106/43 |
| 4,029,000 | 6/1977 | Nakamura et al. | 106/43 |

Primary Examiner—James Poer
Attorney, Agent, or Firm—Fleit & Jacobson

[57] ABSTRACT

A superhard composite material comprises cubic boron nitride and a binder consisting of carbide and diboride of a metal selected from the group IV–V of the periodic system, taken in eutectic ratio, the components being contained therein in the following amounts, in percent by weight:

cubic boron nitride: 28 to 80
carbide and diboride of a metal selected from the group IV–V of the periodic system, taken in eutectic ratio: 72 to 20

The proposed material has high heat, and electrical conductivity, as well as high wear resistance and low brittleness.

4 Claims, No Drawings

SUPERHARD COMPOSITE MATERIAL

BACKGROUND OF THE INVENTION

1. Field of the Application

The present invention relates to superhard materials, and more particularly to a superhard composite material.

The invention is readily adaptable for application in machine-tool industry and other industries where it is necessary to perform cutting of high-duty cast irons, hardened steels and difficult-to-work alloys.

2. Description of the Prior Art

For example, there is known a composite material which comprises cubic boron nitride and alkali-earth metal boride. This material is homogeneous in structure and is fairly resistant to wear. However, the material mentioned above has low heat conductivity, the feature adversely effecting the performance characteristics of the cutting tools manufactured from this material as the cutting surfaces are overheated in the process of machining.

In addition, the material referred to above is electrically nonconductive, which necessitates the provision of a carbon-graphite heater in a high-pressure chamber the working volume of which is thereby substantially reduced and a uniform temperature field is not ensured in the sample being produced.

There is also known a composite material which comprises boron nitride and a binder consisting of carbides and borides of a metal selected from the group IV-VIII of the periodic system. The above-mentioned material shows fairly high brittleness when employed, for example, in the manufacture of cutting tools used for intermittent machining of steels and cast iron. In addition, the compounds and mixtures thereof used as a binder, require high sintering which, in turn, necessitates high pressure to be applied in the process of production of the above-mentioned composite material. The disadvantage inherent in this material makes it difficult to produce large-size samples and renders the sample manufacturing process less efficient.

SUMMARY OF THE INVENTION

It is an object of the present invention to provide a superhard composite material comprising cubic boron nitride, which will have high thermal and electrical conductivity, as well as high resistance to wear and low brittleness.

This object is accomplished by the provision of a superhard composite material comprising cubic boron nitride and a binder consisting of carbide and diboride of a metal selected from the group IV-V of the periodic system, taken in eutectic ratio, said components being contained therein the following amounts, in percent by weight:

cubic boron nitride: 28 to 80
carbide and diboride of a metal selected from the group IV-V of the periodic system, taken in eutectic ratio: 72 to 20

In the $ME^{IV,V}C$-$Me^{IV,V}B_2$, systems, specified mechanical properties are made possible due to eutectic relationship of the components. This can be explained by specific features of this type of the binder, i.e. due to its unique dispersity, which is practically unattainable under equal conditions of sintering one-phase binders $Me^{IV,V}C$ or $Me^{IV,V}B_2$ or their mixture with cubic boron nitride. Such binder structure enables physical properties of the composite material of the invention, such as heat resistance, impact strength, wear resistance and brittle ness, to be substantially improved.

It is not recommended to introduce cubic boron nitride in the amount of less than 28 percent by weight and the binder in the amount of more than 72 percent by weight, since this will result in lower wear resistance of the material; the introduction of more than 80 percent by weight of cubic boron nitride and less than 20 percent by weight of the binder will impair strength characteristics of the samples (higher degree of brittleness and lower degree of bending and compression strength), as well as electrical, and heat conductivity thereof.

The components of the superhard composite material according to the invention are preferably contained therein in the following ratio:

cubic boron nitride 50 to 70
carbide and diboride of a metal selected from the group IV-V of the periodic system, taken in the eutectic ratio: 50 to 30

Such relationship between the components of the composite material of the invention ensures high-duty performance of the latter, as well as high heat, and electrical conductivity thereof.

The superhard composite material according the invention should preferably contain carbide and diboride of titanium or vanadium, taken in eutectic ratio.

Such binder permits the pressure and temperature at which the caking process is conducted to be lowered while preserving high mechanical properties and electrical conductivity of the material.

The superhard composite material according to the invention is produced in the following manner.

First, homogeneous mass is obtained by mixing 28 to 80 wt.% of cubic boron nitride with 72 to 20 wt.% of the binder. The resultant mass is caked under a pressure of 35 to 55 kilobars and at a temperature of 1400° to 1900° C.

The above-indicated temperature is achieved by passing electrical current through a carbon-graphite heater, or directly through said mixture.

The binder contained in the composite material of the invention is basically carbide and diboride of a metal selected from the group IV-V of the periodic system, taken in eutectic ratio. The binder is introduced into the powder of cubic boron nitride, or after finely dividing its eutectic mixture, or else as $Me^{IV,V}C$ and $Me^{IV,V}B_2$, taken in eutectic ratio. The cubic boron nitride to binder grain size ratio is within the range of 1-10:0.1-1. A maximum degree of fixing of the hard grain of cubic boron nitride in the binder is due, apart from their adhesive interaction, to high mechanical properties of the binder, such as its strength and low brittleness, required to prevent the grain of cubic boron nitride from crumbling. High electrical conductivity of the binder makes for high thermal resistance and good performance characteristics of the composite material of the invention, with the heat stress in the cutting region being lowered.

High electrical resistance of the binder permits the caking process to be carried out without any heater by passing electrical current directly through the sample. This, in turn, makes it possible to increase the sample in size and improves the cutting properties of the composite material of the invention.

The cake eutectic mixture $Me^{IV,V}C$-$Me^{IV,V}B_2$, or the corresponding finely dispersed two-phase eutectic mixture, have been found capable of lowering to an appreciable extent the hardness of the binder, for example, with regard to the $TiC-TiB_2$ system, to 1300–1500 kg/mm$^2$ as compared to 3000 kg/mm$^2$ in the event of TiC and $TiB_2$. This enables an increase in the plasticity of the composite material of the invention. The extreme value of the binder bending strength $\sigma_{bend}=95-100$ kg/mm$^2$ is found to be 2 to 3 times as much as $\sigma_{bend}$ of the individual components.

The high mechanical strength is made possible in the fine-grained binder due to slipping effected along the grain boundaries, making for stress relaxation in the region of their concentration, as well as due to the difficulty of the crack spreading in the volume of the proposed composite material.

The superhard composite material of the present invention is superior to the prior-art materials of similar type in that it possesses both high heat, and electrical conductivity, as well as high wear resistance and low brittleness.

The above-indicated properties of the binder enable the pressure-and-temperature parameters of the caking process to be lowered and its efficiency to be thereby enhanced.

The invention will be further described with reference to the following illustrative Examples.

EXAMPLE 1

First a mixture was prepared from 80 wt.% of cubic boron nitride and 20 wt.% of a binder containing 40.2 wt.% TiC and 59.8 wt.% $TiB_2$. The resultant mixture was subjected to caking under a pressure of 50 kilobars and at a temperature of 1700° C., wherein use was made of a graphite heater. The composition of the produced sample conformed to that of the initial mixture. The microhardness of the sample was 5200 kg/mm$^2$, its heat conductivity was 5.5 Bt/m.deg., the wear resistance thereof in the course of five-minute intermittent machining of hardened steel was found to be 0.11 mm.

EXAMPLE 2

A mixture was prepared from 50 wt.% of cubic boron nitride and 50 wt.% of a binder containing 40.2 wt.% TiC and 59.8 wt.% $TiB_2$. The resultant mixture was subjected to caking under a pressure of 50 kilobars and at a temperature of 1700° C., without using a heater. The produced sample conformed in composition to that of the initial mixture. The microhardness of the sample was 3800 kg/mm$^2$, its heat conductivity was about 13 Bt/m.deg., and wear resistance thereof was 0.08 mm.

EXAMPLE 3

A mixture was prepared from 75 wt.% of cubic boron nitride and 25 wt.% of a binder containing 45 wt.% ZrC and 55 wt.% $ZrB_2$. The resultant mixture was then subjected to caking under a pressure of 55 kilobars and at a temperature of 1800° C., without using a heater. The produced sample conformed in composition to that of the initial mixture. The microhardness of the sample was found to be 4900 kg/mm$^2$, its heat conductivity was about 13 Bt/m.deg., and its resistance was 0.10 mm.

EXAMPLE 4

A mixture was prepared from 54 wt.% of cubic boron nitride and 46 wt.% of a binder containing 45 wt.% ZrC and 55 wt.% $ZrB_2$. The resultant mixture was formed into cakes under a pressure of 55 kilobars and at a temperature of 1800° C. without resorting to the use of heaters. The composition of the produced sample conformed to that of the original mixture. The microhardness of the sample was 3900 kg/mm$^2$, its heat conductivity was 26 Bt/m.deg., and its wear resistance was 0.08 mm.

EXAMPLE 5

A mixture was prepared from 75 wt.% of cubic boron nitride and 25 wt.% of a binder containing 42 wt.% HfC and 58 wt.% $HfB_2$. The resultant mixture was formed into cakes under a pressure of 55 kilobars and at a temperature of 1850° C. without resorting to the use of heaters. The composition of the produced sample conformed to that of the initial mixture. The microhardness of the sample was found to be 3800 kg/mm$^2$, its heat conductivity was 24 Bt/m.deg., and its wear resistance was 0.10 mm.

EXAMPLE 6

A mixture was prepared from 42 wt.% of cubic boron nitride and 58 wt.% of a binder containing 42 wt.% of HfC and 58 wt.% $HfB_2$. The resultant mixture was formed into cakes under a pressure of 55 kilobars and at a temperature of 1850° C. without resorting to the use of heaters. The composition of the produced sample conformed to that of the initial mixture. The microhardness of the sample was found to be 3800 kg/mm$^2$, its heat conductivity was 24 Bt/m.deg., and its wear resistance was 0.10 mm.

EXAMPLE 7

A mixture was prepared from 80 wt.% of cubic boron nitride and 20 wt.% of a binder containing 50 wt.% VC and 50 wt.% $VB_2$. The resultant mixture was formed into cakes under a pressure of 55 kilobars and at a temperature of 1850° C. without using a heater. The composition of the obtained sample conformed to that of the initial mixture. The microhardness of the sample was 5100 kg/mm$^2$, its heat conductivity was 4.5 Bt/m.deg., and its wear resistance was 0.09 mm.

EXAMPLE 8

A mixture was prepared from 52 wt.% of cubic boron nitride and 48 wt.% of a binder containing 50 wt.% VC and 50 wt.% $VB_2$. The resultant mixture was formed into cakes under a pressure of 55 kilobars and at a temperature of 1800° C. without using a heater. The produced sample conformed in composition to that of the initial mixture. The microhardness of the sample was found to be 3100 kg/mm$^2$, its heat conductivity was 11 Bt/m.deg., and its wear resistance was 0.06 mm.

EXAMPLE 9

A mixture was prepared from 61 wt.% of cubic boron nitride and 39 wt.% of a binder containing 34 wt.% TaC and 66 wt.% $TaB_2$. The resultant mixture was formed into cakes under a pressure of 55 kilobars and at a temperature of 1800° C. without using a heater. The produced sample conformed in composition to that of the initial mixture. The microhardness of the sample was found to be 4100 kg/mm$^2$, its heat conductivity was 13 Bt/m.deg., and its wear resistance was 0.11 mm.

EXAMPLE 10

A mixture was prepared from 28 wt.% of cubic boron nitride and 72 wt.% of a binder containing 34 wt.% TaC and 66 wt.% $TaB_2$. The composition of the sample produced as described in Example 9 conformed to the composition of the initial mixture. The microhardness of the sample was 3050 kg/mm², its heat conductivity was 22 Bt/m.deg., and its wear resistance was 0.17 mm.

EXAMPLE 11

A mixture was prepared from 64 wt.% of cubic boron nitride and 36 wt.% of a binder containing 45 wt.% NbC and 55 wt.% NbB₂. The composition of the sample produced as described in Example 9 conformed to the composition of the initial mixture. The microhardness of the sample was found to 5200 kg/mm², its heat conductivity was 4.5 Bt/m.deg., its wear resistance was 0.10 mm.

EXAMPLE 12

A mixture was prepared from 32 wt.% of cubic boron nitride and 68 wt.% of a binder containing 45 wt.% NbC and 55 wt.% NbB₂. The composition of the sample produced as described in Example 9 conformed to the composition of the initial mixture. The microhardness of the sample was found to be 4400 kg/mm², its heat conductivity was 7 Bt/m.deg., and its wear resistance was 0.07 mm.

EXAMPLE 13

A mixture was prepared from 70 wt.% of cubic boron nitride and 30 wt.% of a binder containing 40.2 wt.% TiC and 59.8 wt.% TiB₂. The composition of the sample produced as described in Example 9 conformed to that of the initial mixture. The microhardness of the sample was found to be 4900 kg/mm², its heat conductivity was 7 Bt/m.deg., and its wear resistance was 0.07 mm.

What is claimed is:

1. A superhard composite material consisting essentially of cubic boron nitride and a binder consisting essentially of a carbide and a diboride of one metal selected from the group IV and V metals of the periodic system, said carbide and diboride present in eutectic ratio, said components being present in the following amounts:

|  | Per cent by weight |
|---|---|
| cubic boron nitride | 28 to 80 |
| carbide and diboride [of a metal selected from the group IV-V of the periodic system] | 72 to 20 |

2. A superhard composite material as claimed in claim 1, wherein the components are contained in the following ratio:

|  | Per cent by weight |
|---|---|
| cubic boron nitride | 50 to 70 |
| carbide and diboride [of a metal selected from the group IV-V of the periodic system] | 50 to 30 |

3. A superhard composite material as claimed in claim 1, in which said one metal is titanium.

4. A superhard composite material as claimed in claim 1, in which said one metal is vanadium.

* * * * *